United States Patent [19]

Schmid et al.

[11] Patent Number: 4,548,729
[45] Date of Patent: Oct. 22, 1985

[54] AQUEOUS FOAM-INHIBITING COMPOSITIONS CONTAINING ALKYL POLYETHYLENE GLYCOL ALKYL ETHERS

[75] Inventors: Karl Schmid, Mettmann; Horst Baumann, Leichlingen; Jürgen Geke, Düsseldorf; Hans-Günther Germscheid, Hösel; Werner Lüdecke, Erkrath; Robert Piorr, Ratingen; Christian Rossmann, Langenfeld; Rolf Scharf, Monheim; Hans-Joachim Schlüssler, Haan, all of Fed. Rep. of Germany

[73] Assignee: Henkel KGaA, Dusseldorf, Fed. Rep. of Germany

[21] Appl. No.: 601,475

[22] Filed: Apr. 18, 1984

[30] Foreign Application Priority Data

May 2, 1983 [DE] Fed. Rep. of Germany ....... 3315951

[51] Int. Cl.$^4$ ................................................ C11D 1/72
[52] U.S. Cl. .......................... 252/174.21; 252/174.22; 252/321; 252/358
[58] Field of Search ....................... 252/174.21, 174.22, 252/DIG. 10, 358, 321, 99, 135; 568/613

[56] References Cited

U.S. PATENT DOCUMENTS

| | | | |
|---|---|---|---|
| 3,198,744 | 8/1965 | Lamont | 252/321 |
| 3,463,737 | 8/1969 | Worms | 252/153 |
| 3,491,029 | 1/1970 | Worms | 252/156 |
| 3,696,057 | 10/1972 | Scharf | 252/544 |
| 4,086,279 | 4/1978 | Langdon et al. | 252/174.21 |
| 4,405,490 | 9/1983 | Maas et al. | 252/321 |

FOREIGN PATENT DOCUMENTS

| | | |
|---|---|---|
| 868147 | 2/1953 | Fed. Rep. of Germany . |
| 1280455 | 10/1968 | Fed. Rep. of Germany . |
| 1289597 | 2/1969 | Fed. Rep. of Germany . |
| 1944569 | 6/1977 | Fed. Rep. of Germany . |
| 1621592 | 4/1978 | Fed. Rep. of Germany . |
| 1621593 | 4/1978 | Fed. Rep. of Germany . |
| 0025398 | 2/1983 | Japan . |
| 1172134 | 11/1969 | United Kingdom . |
| 1172135 | 11/1969 | United Kingdom . |
| 1207777 | 10/1970 | United Kingdom . |
| 1445716 | 8/1976 | United Kingdom . |

*Primary Examiner*—Paul Lieberman
*Assistant Examiner*—Hoa Van Le
*Attorney, Agent, or Firm*—Ernest G. Szoke; Nelson Littell, Jr.; Henry E. Millson, Jr.

[57] ABSTRACT

Foam-inhibiting compositions for use in an aqueous solution containing polyethylene glycol ethers corresponding to the following formula

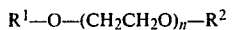

$$R^1-O-(CH_2CH_2O)_n-R^2$$

in which $R^1$ represents a linear or branched alkyl or alkenyl radical containing from 8 to 18 carbon atoms, $R^2$ represents an alkyl radical containing from 4 to 8 carbon atoms and n is a number of from 7 to 12, mixtures of the same with a polyglycerol polyethylene glycol alkyl ether of 1 part by weight of polyglycerol having a hydroxyl number in the range of from 900 to 1200 adducted with from 4 to 20 parts by weight of ethylene oxide and etherified at the free hydroxyl groups with alkyls having from 4 to 8 carbon atoms, and their use as foam-inhibiting additives for low-foam cleaning agents.

9 Claims, No Drawings

AQUEOUS FOAM-INHIBITING COMPOSITIONS CONTAINING ALKYL POLYETHYLENE GLYCOL ALKYL ETHERS

BACKGROUND OF THE INVENTION

This invention relates to terminal-group-blocked alkyl polyethylene glycol ethers, mixtures of the same with terminal-group-blocked polyglycerol polyethylene glycol ethers, and their use as foam-inhibiting additives in low-foam cleaning agents.

Aqueous cleaning agents intended for use in industry and commerce, particularly for cleaning metal, glass, ceramic and plastic surfaces, generally contain substances which are capable of counteracting undesirable foaming. The use of foam-inhibiting additives is generally necessitated by the fact that the impurities detached from the substrates and accumulated in the cleaning baths act as foam formers. In addition, the use of antifoam agents may also be necessitated by the fact that the cleaning agents themselves contain constituents to give rise to undesirable foaming under the particular working conditions, for example anionic tensides or nonionic tensides which foam at the particular working temperature.

Adducts of alkylene oxides with organic compounds containing—preferably several—reactive hydrogen atoms in the molecule have long been successfully used as foam-inhibiting additives. Adducts of propylene oxide with aliphatic polyalcohols (see German Pat. Nos. 1,280,455 and 1,621,592, corresponding to U.S. Pat. No. 3,491,029 and G.B. Pat. No. 1,172,135, respectively) and with aliphatic polyamines (see German Pat. Nos. 1,289,597 and 1,621,593, corresponding to U.S. Pat. No. 3,463,737 and G.B. Pat. No. 1,172,134, respectively) and also adducts of ethylene oxide and propylene oxide with aliphatic polyamines, particularly ethylene diamine (see German Pat. No. 1,944,569 corresponding to U.S. Pat. No. 3,696,057), have proved to be particularly effective in practice. In addition to a favorable foam-inhibiting effect, alkylene oxide adducts such as these also show the stability to alkalis generally required for use in industrial and commercial cleaners. However, compounds of this class are not sufficiently biodegradable to satisfy many current legislative requirements.

OBJECTS OF THE INVENTION

An object of the present invention is to provide foam-inhibiting substances of which the performance properties are at least equivalent to those of known foam-inhibiting agents and which, in addition, also show the required biodegradability.

Another object of the present invention is the development of an alkyl polyethylene glycol alkyl ether having the formula $$R^1-O-(CH_2CH_2O)_n-R^2$$

wherein $R^1$ is a member having from 8 to 18 carbon atoms selected from the group consisting of alkyl and alkenyl, $R^2$ is an alkyl having from 4 to 8 carbon atoms and n is an integer of from 7 to 12.

A further object is the development of a foam-inhibiting composition for use in an aqueous solution consisting essentially of a mixture of (a) an alkyl polyethylene glycol alkyl ether having the formula $$R^1-O-(CH_2CH_2O)_n-R^2$$

wherein $R^1$ is a member having from 8 to 18 carbon atoms selected from the group consisting of alkyl and alkenyl, $R^2$ is an alkyl having from 4 to 8 carbon atoms and n is an integer of from 7 to 12 and b) a polyglycerol polyethylene glycol alkyl ether of 1 part by weight of polyglycerol having a hydroxyl number in the range of from 900 to 1200 adducted with from 4 to 20 parts by weight of ethylene oxide and etherified at the free hydroxyl groups with alkyls having from 4 to 8 carbon atoms, in a ratio by weight of a:b of from 1:1 to 9:1.

A yet further object of the present invention is an improvement in the process of controlling undesirable foam development when subjecting surfaces of metal, glass ceramic or plastic to an aqueous washing process by addition of a foam-inhibiting substance thereto, the improvement consisting of using a foam-inhibiting amount of an alkyl polyethylene glycol alkyl ether having the formula $$R^1-O-(CH_2CH_2O)_n-R^2$$

wherein $R^1$ is a member having from 8 to 18 carbon atoms selected from the group consisting of alkyl and alkenyl, $R^2$ is an alkyl having from 4 to 8 carbon atoms and n is an integer of fron 7 to 12, as said foam-inhibiting substance.

A still further object of the present invention is an improvement in the process of controlling undesirable foam development when subjecting surfaces of metal, glass ceramic or plastic to an aqueous washing process by addition of a foam-inhibiting substance thereto, the improvement consisting of using a foam-inhibiting amount of a foam-inhibiting composition for use in an aqueous solution consisting essentially of a mixture of a) an alkyl polyethylene glycol alkyl ether having the formula $$R^1-O-(CH_2CH_2O)_nR^2$$

wherein $R^1$ is a mixture having from 8 to 18 carbon atoms selected from the group consisting of alkyl and alkenyl, $R^2$ is an alkyl having from 4 to 8 carbon atoms and n is an integer of from 7 to 12, and b) a polyglycerol polyethylene glycol alkyl ether of 1 part by weight of polyglycerol having a hydroxyl number in the range of from 900 to 1200 adducted with from 4 to 20 parts by weight of ethylene oxide and etherified at the free hydroxyl groups with alkyls having from 4 to 8 carbon atoms, in a ratio by weight of a:b of from 1:1 to 9:1, as said foam-inhibiting substance.

These and other objects of the invention will become apparent as the description thereof proceeds.

DESCRIPTION OF THE INVENTION

The drawbacks of the prior art have been overcome and the above objects have been achieved in the present invention starting from the observation that certain terminal-group-blocked adducts of ethylene oxide with relatively long chain aliphatic alcohols, which are defined hereinafter, are capable of satisfying current requirements both in regard to performance and also in regard to biodegradability.

The present invention relates to the use of polyethylene glycol ethers corresponding to the following formula I $$R^1-O-(CH_2CH_2O)_nR^2 \qquad I$$

in which $R^1$ is a linear or branched alkyl radical or alkenyl radical containing from 8 to 18 carbon atoms, $R^2$ is an alkyl radical containing from 4 to 8 carbon atoms and n is a number of from 7 to 12, as foam-inhibiting additives for low-foam cleaning agents.

More particularly, the present invention relates to an alkyl polyethylene glycol alkyl ether having the formula $$R^1-O-(CH_2CH_2O)_n-R^2$$

wherein $R^1$ is a member having from 8 to 18 carbon atoms selected from the group consisting of alkyl and alkenyl, $R^2$ is an alkyl having from 4 to 8 carbon atoms and n is an integer of from 7 to 12; as well as an improvement in the process of controlling undesirable foam development when subjecting surfaces of metal, glass, ceramic or plastic to an aqueous washing process by addition of a foam-inhibiting substance thereto, the improvement consisting of using a foam-inhibiting amount of an alkyl polyethylene glycol alkyl ether having the formula $$R^1-O-(CH_2CH_2O)_n-R^2$$

wherein $R^1$ is a member having from 8 to 18 carbon atoms selected from the group consisting of alkyl and alkenyl, $R^2$ is an alkyl having from 4 to 8 carbon atoms and n is an integer of from 7 to 12, as said foam-inhibiting substance.

Suitable starting materials for the production of the polyglycol ethers of formula I are the fatty alcohols n-octanol, n-decanol, n-dodecanol, n-tetradecanol, n-hexadecanol, n-octadecanol, n-octadecen-9,10-ol (oleyl alcohol) and oxoalcohols containing the above-mentioned number of carbon atoms, used either individually or in admixture.

To produce the alkyl polyethylene glycol ethers used in accordance with the invention, the fatty alcohols described in the foregoing are best reacted with ethylene oxide in a molar ratio of from 1:7 to 1:12 and the hydroxyl groups present in the reaction product obtained are subsequently etherified. The reaction of ethylene oxide is carried out under the known alkoxylation conditions, preferably in the presence of suitable alkaline catalysts. The etherification of the free hydroxyl groups is preferably carried out under the known conditions of Williamson's ether synthesis using linear or branched $C_4-C_8$-alkyl halides, for example n-butyl iodide, sec.-butyl bromide, tert.-butyl chloride, amyl chloride, tert.-amyl bromide, n-hexyl chloride, n-heptyl bromide and n-octyl chloride. In this connection, it may be advisable to use the alkyl halide and alkali, such as an alkali metal hydroxide, in a stoichiometric excess, for example of from 100% to 200%, over the hydroxyl groups to be etherified.

The biodegradability of the terminal-group-blocked alkyl polyethylene glycol ethers used in accordance with the invention, as determined by the prescribed methods, is equivalent to a BiAS-removal of more tha 80%.

One special embodiment of the invention is characterized by the use of polyglycol ethers of formula I in which n is a number of from 8 to 10. The use of compounds corresponding to formula I, in which $R^2$ represents n-butyl and n=9, is particularly preferred.

In another preferred embodiment of the invention, the polyglycol ethers corresponding to formula I are used in combination with polyglycerol polyethylene glycol ethers of the type obtainable by the addition of from 4 to 20 parts by weight of ethylene oxide onto 1 part by weight of polyglycerol having a hydroxyl number of from 900 to 1200, followed by etherification of the free hydroxyl groups with alkyl halides containing from 4 to 8 carbon atoms.

More particularly, in this embodiment, the invention relates to a foam-inhibiting composition for use in an aqueous solution consisting essentially of a mixture of a) an alkyl polyethylene glycol alkyl ether having the formula $$R^1-O-(CH_2CH_2O)_n-R^2$$

wherein $R^1$ is a member having from 8 to 18 carbon atoms selected from the group consisting of alkyl and alkenyl, $R^2$ is an alkyl having from 4 to 8 carbon atoms and n is an integer of from 7 to 12 and b) a polyglycerol polyethylene glycol alkyl ether of 1 part by weight of polyglycerol having a hydroxyl number in the range of from 900 to 1200 adducted with from 4 to 20 parts by weight of ethylene oxide and etherified at the free hydroxyl groups with alkyls having from 4 to 8 carbon atoms, in a ratio by weight of a:b of from 1:1 to 9:1; as well as an improvement in the process of controlling undesirable form development when subjecting surfaces of metal, glass ceramic or plastic to an aqueous washing process by addition of a foam-inhibiting substance thereto, the improvement consisting of using a foam-inhibiting amount of a foam-inhibiting composition for use in an aqueous solution consisting essentially of a mixture of (a) an alkyl polyethylene glycol alkyl ether having the formula $$R^1-O-(CH_2CH_2O)_n-R^2$$

wherein $R^1$ is a metal having from 8 to 18 carbon atoms selected from the group consisting of alkyl and alkenyl, $R^2$ is an alkyl having from 4 to 8 carbon atoms and n is an integer of from 7 to 12 and b) a polyglycerol polyethylene glycol alkyl ether of 1 part by weight of polyglycerol having a hydroxyl number in the range of from 900 to 1200 adducted with from 4 to 20 parts by weight of ethylene oxide and etherified at the free hydroxyl groups with alkyls haing from 4 to 8 carbon atoms, in a ratio by weight of a:b of from 1:1 to 9:1 as said foam-inhibiting substance.

The starting material for producing the terminal-group-blocked polyglycerol polyglycol ethers accumulates as distillation residue in the industrial production of glycerol. The distillation residue in question consists of mixture of relatively high molecular weight condensation products of glycerol, preferably those containing from 2 to 10 glycerol residues in the molecule. These polyglycerols are characterized by their hydroxyl number which is generally between 900 and 1200. Corresponding polyglycerols may also be synthetically obtained, for example by the prolonged heating of glycerol to 220° C. to 240° C. in the presence of caustic alkali, preferably in an inert gas atmosphere, and distilling off the water formed during the condensation reaction.

To produce the terminal-group-blocked polyglycerol polyglycol ethers, the polyglycerols described above are best reacted with ethylene oxide in a ratio by weight of from 1:4 to 1:20, followed by etherification of the hydroxyl groups present in the reaction prcduct obtained. The reaction with ethylene oxide and the etherification of the hydroxyl groups with alkyl halides are carried out in the same way as described above in reference to the production of the terminal-group-blocked fatty alcohol polyethylene glycol ethers.

It has been found that mixtures of the polyglycol ethers of formula I and the terminal-group-blocked polyglycerol polyglycol ethers defined above in a ratio by weight of from 1:1 to 9:1 and preferably from 2.3:1 to 9:1 are distinguished by an unexpectedly strong foam-inhibiting effect. These mixtures also satisfy legislative requirements in regard to biodegradability.

The above-mentioned polyglycerol polyglycol alkyl ethers and their use as foam-inhibiting additives in low-foam cleaning agents is the subject of copending U.S. patent application Ser. No. 601,477, filed simultaneously herewith and is not the subject of the present invention.

The terminal-group-blocked polyglycol ethers of formula I used in accordance with the invention and the polyglycerol polyglycol alkyl ethers in question here are distinguished by their stability to alkalis and acids. The foam-inhibiting effect of the compounds of formula I in alkaline to mildly acidic cleaning solutions is at least as good as that of comparable known foam inhibitors. The described mixtures of compounds corresponding to formula I and terminal-group-blocked polyglycerol ethylene glycol ethers are superior to known foam inhibitors.

The cleaning agents in which the terminal-group-blocked polyglycol ethers are used in accordance with the invention may contain the constituents normally present in preparations of this type, such as wetting agents, builders and complexing agents, alkalis or acids, corrosion inhibitors and, if desired, even antimicrobial agents and/or organic solvents. Suitable wetting agents are nonionic surface-active compounds, such as polyglycol ethers of the type obtained by the addition of ethylene oxide onto alcohols, particularly fatty alcohols, alkyl phenols, fatty amines and carboxylic acid amides, particularly higher fatty acid amides, and anion-active wetting agents, such as alkali metal, amine and alkylolamine salts of fatty acids, alkyl sulfuric acids, alkyl sulfonic acids and alkyl benzene sulfonic acids.

The builders and complexing agents which the cleaning agents may contain are, above all, alkali metal orthophosphates, alkali metal polymer phosphates, alkali metal silicates, alkali metal borates, alkali metal carbonates, alkali metal polyacrylates and alkali metal gluconates and also citric acid, nitriloacetic acid, ethylene diamine tetraacetic acid, 1-hydroxyalkane-1,1-diphosphonic acid, amino-(trimethylenephosphonic acid) and ethylene diamine-(tetrametylenephosphonic acid), phosphonoalkane polycarboxylic acids such as, for example, phosphonobutane tricarboxylic acid, and alkali metal salts of these acids. Highly alkaline cleaning agents, particularly those for washing bottles, contain considerable quantities of caustic alkali in the form of sodium and potassium hydroxide. If it is desired to obtain special cleaning effects, the cleaning agents may contain organic solvents, for example alcohols, petrol fractions and chlorinated hydrocarbons, and free alkylolamines.

In the context of the invention, cleaning agents are primarily understood to be the aqueous solutions intended for direct application to the substrates to be cleaned. In addition, the expression "cleaning agents" also applies to the concentrates and solid mixtures intended for the preparation of the working solutions.

The concentrates and solid mixtures are especially a cleaning compositions for use in an aqueous system comprising from 0 to 25% of at least one wetting agent, from 0 to 80% of at least one builder and complexing agent, from 0 to 80% of an alkali metal hydroxide, and from 1% to 30% of at least one foam inhibiting composition for use in an aqueous solution, said foam inhibiting composition consisting essentially of either an alkyl polyethylene glycol alkyl ether having the formula

$$R^1\text{—}O\text{—}(CH_2CH_2O)_n\text{—}R^2$$

wherein $R^1$ is a member having from 8 to 18 carbon atoms selected from the group consisting of alkyl and alkenyl, $R^2$ is an alkyl having from 4 to 8 carbon atoms and n is an integer of from 7 to 12, or a mixture of a) an alkyl polyethylene glycol alkyl ether having the formula

$$R^1\text{—}O\text{—}(CH_2CH_2O)_n\text{—}R^2$$

wherein $R^1$ is a member having from 8 to 18 carbon atoms selected from the group consisting of alkyl and alkenyl, $R^2$ is an alkyl having from 4 to 8 carbon atoms and n is an integer of from 7 to 12, and b) a polyglycerol polyethylene glycol alkyl ether of 1 part by weight of polyglycerol having a hydroxyl number in the range of from 900 to 1200 adducted with from 4 to 20 parts by weight of ethylene oxide and etherified at the free hydroxyl groups with alkyls having from 4 to 8 carbon atoms; in a ratio by weight of a:b from 1:1 to 9:1, where the total amount of ingredients is 100%.

The solutions ready for use may be mildly acidic to strongly alkaline.

The terminal-group-blocked polyglycol ethers used in accordance with the invention are added to the cleaning agents in such quantities that their concentration makes up from 10 to 2500 ppm and preferably from 50 to 500 ppm in the ready-to-use solutions.

The following examples are illustrative of the practice of the invention without being deemed limitative.

EXAMPLES

Production of the terminal-group-blocked alkyl polyglycol ethers 676 g (1 mol) of the adduct of 10 mols of ethylene oxide with n-dodecanol, 185 g (2 mols) of n-butyl chloride and 320 g of 75% by weight sodium hydroxide (6 mols of NaOH) were stirred for 4 hours at 120° C. 300 ml of water were added to the cooled reaction mixture. The aqueous phase was then separated off, after which the organic phase was washed with water at approximately 50° C. until the washing liquid showed a neutral reaction. Unreacted butyl chloride and water were removed from the reaction product by heating to 50° C. in a water jet vacuum. 680 g of n-dodecyl ethyelene glycol butyl ether (n-dodecanol+10EO+butyl) were obtained. The product had a hydroxyl number of 3.5.

A number of other terminal-group-blocked alkyl polyethylene glycol ethers was similarly produced. These substances and the product described above are shown in Table I together with their cloud points in water or in 1% by weight NaOH-solution.

TABLE I

Terminal-group-blocked alkyl polyethylene glycol ethers

| Product Example | Composition | Cp(H$_2$O) °C. | Cp(NaOH)* °C. |
|---|---|---|---|
| A | n-dodecanol + 9EO + n-butyl | — | 16 |
| B | n-dodecanol + 10EO + n-butyl | 32 | 24 |
| C | C$_{8-14}$-fatty alcohol + 9EO + n-butyl | — | 16 |
| D | C$_{8-14}$-fatty alcohol + 11EO + n-hexyl | 5 | <5 |
| E | C$_{8-18}$-fatty alcohol + 10EO + n-butyl | — | 20 |
| F | C—12-18-fatty alcohol + 10EO + n-butyl | — | 21 |

*as measured in a 1% by weight NaOH solution

Production of the terminal-group-blocked polyglycerol polyethylene glycol ethers In a lift-type mixer autoclave, 137 g of polyglycerol (hydroxyl number 961) were reacted with 1176 g of ethylene oxide (ratio by weight 1:8.6) at 180° C. and 10 bar in the presence of 3 g of sodium methylate. 1313 g of polyglycerol ethylene glycol ether, hydroxyl number 113, were obtained.

350 g of the product obtained, 171 g of n-hexyl chloride and 228 g of 75% by weight sodium hydroxide solution were stirred for 4 hours at 120° C. The aqueous phase was separated off from the cooled reaction mixture. The organic phase was washed with water at 50° C. until the washing liquid showed a neutral reaction. Unreacted hexyl chloride and water were removed from the reaction mixture by heating to 150° C. in a water jet vacuum. 281.5 g of polyglycerol polyethylene glycol hexyl ether (1 part by weight of polyglycerol +8.6 parts by weight of EO+hexyl) were obtained. The product had a hydroxyl number of 3.5.

Other terminal-group-blocked polyglycerol polyethylene glycol ethers were similarly produced. These substances and the product described above are shown in Table II together with their cloud points in water or 1% by weight NaOH-solution.

TABLE II

Terminal-group-blocked polyglycerol polyethylene glycol ethers

| Product Example | Composition (PG = polyglycerol; EO = ethylene oxide pbw = parts by weight) | Cp(H$_2$O) °C. | Cp(NaOH)* °C. |
|---|---|---|---|
| G | 1 pbw PG + 4.3 pbw EO + n-butyl | — | 21 |
| H | 1 pbw PG + 5.0 pbw EO + n-butyl | — | 28 |
| I | 1 pbw PG + 5.7 pbw EO + n-butyl | — | 40 |
| J | 1 pbw PG + 5.7 pbw EO + n-hexyl | 5 | — |
| K | 1 pbw PG + 8.6 pbw EO + n-butyl | — | 45 |
| L | 1 pbw PG + 8.6 pbw EO + n-hexyl | 15 | — |
| M | 1 pbw PG + 8.6 pbw EO + n-octyl | — | 5 |
| N | 1 pbw PG + 13.0 pbw EO + n-hexyl | 20-31 | — |

*as measured in a 1% by weight NaOH solution

EXAMPLE 1

The antifoam effect was tested using test solutions containing 1% by weight of sodium hydroxide and 0.03% by weight (300 ppm) of defoaming agent. In the course of the tests, triethanolamine tetrapropylene benzene sulfonate was added to these solutions as the test foaming agent in quantities increasing in stages by amounts of 100 ppm. The defoaming agents tested were products A to F and the following mixtures:

| O | 9 parts by weight of A 1 part by weight of K |
|---|---|
| P | 9 parts by weight of A 1 part by weight of M |
| Q | 4 parts by weight of A 1 part by weight of L. |
| R | Ethylene diamine + 30 EO + 30 PO (PO = propylene oxide) was used for comparison. |

Quantities of 200 ml of the test solutions were tested at 65° C. in the foam beating apparatus according to DIN 53902. The foam volume in ml was read off at 5 second intervals after a series of 100 beats in 100 seconds. An average value from 5 individual measurements was determined for each concentration of the test foam agent. From the results obtained, the foam volume observed at a concentration of the test foaming agent of 1200 ppm is shown in the second column of Table III below. As a second representative measured value, the concentration of test foaming agent at which a foam volume of more than 200 ml was measured for the first time is shown in the third column of Table III.

TABLE III

| Defoaming agent | ml of foam at 1200 ppm of test foaming agent | ppm of test foaming agent for >200 ml of foam |
|---|---|---|
| A | 40 | 2000 |
| B | 50 | 1800 |
| C | 50 | 1800 |
| D | 60 | 1600 |
| E | 60 | 1600 |
| F | 35 | 2000 |
| O | 40 | 2000 |
| P | 30 | 2400 |
| Q | 40 | 2800 |
| R (comparison) | 40 | 1800 |
| L (comparison) | 65 | 2800 |

EXAMPLE 2

A storable, solid bottle washing preparation was prepared by mechanically mixing the following components: 80 parts by weight of caustic soda, 12 parts by weight of sodium tripolyphosphate, 5 parts by weight of sodium silicate (molar ratio of Na$_2$O to SiO$_2$ 1:3.35) and 3 parts by weight of product B. Using a 1% by weight solution of this preparation, milk bottles were washed at 80° C. in a standard bottle washing machine having one solution zone and a hourly throughput of 18000 bottles. The cleaning effect was good and no troublesome foaming was observed.

EXAMPLE 3

A storable solid mixture was obtained by mechanically mixing the following active components: 80 parts by weight of sodium tripolyphosphate and 20 parts by weight of product D. Beer bottles were washed at 85° C. in a bottle washing machine having three solution zones and an hourly throughput of 80,000 bottles. The beer bottles were labeled with paper labels using casein glue which normally causes vigorous foaming in the immersion baths. When 1.5% by weight sodium hydroxide solution containing 0.15% by weight of the active mixture described above was used for cleaning, the machine could be operated without any troublesome foaming.

EXAMPLE 4

A storable mixture was prepared by mechanically mixing the following active components: 40 parts by weight of sodium ethylene diamine tetraacetate, 20 parts by weight of sodium tripolyphosphate, 30 parts by weight of sodium gluconate, 10 parts by weight of product F.

Wine bottles were washed at 85° C. in a standard commercial bottle washing machine having two separate solution zones and an hourly throughput of 24,000 bottles. A 1.5% by weight sodium hydroxide soluition to which 0.5% by weight of the concentrate described above had been added was used as the cleaning solution. Washing was not accompanied by any troublesome foaming and the bottles were satisfactorily clean.

EXAMPLE 5

A concentrated cleaning agent was prepared by dissolving the following components in phosphoric acid: 5 parts by weight of amino-(trimethylene phosphonic acid) 10 parts by weight of 1-hydroxyethane-1,1-diphosphonic acid, 5 parts by weight of phosphonobutane tricarboxylic acid, 27 parts by weight of product A, 3 parts by weight of product M, 10 parts by weight of ethanol, 40 parts by weight of phosphoric acid (75% by weight).

Mineral water bottles were washed at 80° C. in a conventional bottle washing machine having three solution zones. A 2% by weight sodium hydroxide solution to which 0.1% by weight of the concentrate described above had been added was used as the cleaning solution. Washing was not accompanied by any troublesome foaming and the bottles were satisfactorily clean.

EXAMPLE 6

A storable cleaning agent for cleaning metal surfaces by spraying was prepared by mechanically mixing the following components: 80 parts by weight of sodium metasilicate pentahydrate, 16 parts by weight of sodium tripolyphosphate, 4 parts by weight of coconut fatty amine + 12 EO, 1 part by weight of product A.

The foam formation and foam collapse of a 2% by weight solution of this cleaning agent was tested at 60° C. in accordance with DIN 53902 by comparison with an agent which did not contain product A, but which had otherwise the same composition. The results are set out in Table IV below.

TABLE IV

| Cleaning agent | ml of foam after mins. | | | |
|---|---|---|---|---|
| | 0 | 1 | 2 | 10 |
| Comparison | 530 | 140 | 0 | 0 |
| According to the invention | 170 | 15 | 0 | 0 |

EXAMPLE 7

An immersion-type degreasing agent for metals was prepared by mechanically mixing the following components: 40 parts by weight of sodium metasilicate pentahydrate, 35 parts by weight of sodium carbonate, 20 parts by weight of sodium tripolyphosphate, 2.5 parts by weight of sodium alkyl benzene sulfonate, 2.5 parts by weight of nonyl phenol + 14 EO, 4.5 parts by weight of product D and 0.5 part by weight of product J.

Greasy steel moldings were cleaned at 60° C. by immersion in a 4% by weight solution of this cleaning agent. The degreasing effect was very good and no troublesome foaming was observed.

EXAMPLE 8

A storable concentrate for cleaning metal surfaces was prepared by dissolving the following components in water: 300 parts by weight of sodium caprylate, 10 parts by weight of borax, 14 parts by weight of sodium tripolyphosphate, 10 parts by weight of triethanolamine, 2 parts by weight of monoethanolamine, 6 parts by weight of product C and 78 parts by weight of water.

Iron surfaces were sprayed at 50° C. to 55° C. with a 1.5% by weight solution of this cleaning agent (pH-value 8.5). The cleaning effect was good and no troublesome foaming was observed.

EXAMPLE 9

A storable concentrate for cleaning metal surfaces was prepared by dissolving the following components in water: 25 parts by weight of the diethanolamine salt of isononanoic acid, 20 parts by weight of diethanolamine, 1 part by weight of benztriazole, 4 parts by weight of product C and 50 parts by weight of water.

Grey iron castings were sprayed at 50° C. to 55° C. with a 1% by weight solution of this cleaning agent. The cleaning effect was good and no troublesome foaming was observed.

The preceding specific embodiments are illustrative of the practice of the invention. It is to be understood however, that other edients known to those skilled in the art or disclosed herein may be employed without departing from the spirit of the invention or the scope of the appended claims.

We claim:

1. A foam-inhibiting composition for use in an aqueous solution consisting essentially of a mixture of (a) an alkyl polyethylene glycol alkyl ether having the formula $$R^1\!-\!O\!-\!(CH_2CH_2O)_n\!-\!R^2$$

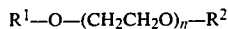

wherein $R^1$ is a member having from 8 to 18 carbon atoms selected from the group consisting of alkyl and alkenyl, $R^2$ is an alkyl having from 4 to 8 carbon atoms and n is an integer of from 7 to 12 and b) a polyglycerol polyethylene glycol alkyl ether of 1 part by weight of polyglycerol having a hydrcxyl number in the range of from 900 to 1200 adducted with from 4 to 20 parts by weight of ethylene oxide and etherified at the free hydroxyl group with alkyls having from 4 to 8 carbon atcms, in a ratio by weight of a:b of from 1:1 to 9:1.

2. The foam-inhibiting composition of claim 1 wherein the ratio of (a) to (b) is from 2.3:1 to 9:1.

3. In the process of controlling undesirable foam development when subjecting surfaces of metal, glass, ceramic or plastic to an aqueous washing process by addition of a foam-inhibiting substance thereto, the improvement consisting of using a foam-inhibiting amount of a foam-inhibiting composition for use in an aqueous solution consisting essentially of a mixture of (a) an alkyl polyethylene glycol alkyl ether having the formula $$R^1\!-\!O\!-\!(CH_2CH_2O)_n\!-\!R^2$$

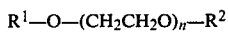

wherein $R^1$ is a member having from 8 to 18 carbon atoms selected from the group consisting of alkyl and alkenyl, $R^2$ is an alkyl having from 4 to 8 carbon atoms and n is an integer of from 7 to 12 and (b) a polyglycerol polyethylene glycol alkyl ether of 1 part by weight of polyglycerol having a hydroxyl number in the range of from 900 to 1200 adducted with from 4 to 20 parts by weight of ethylene oxide and etherified at the free hydroxyl group with alkyls having from 4 to 8 carbon atoms, in a ratio of weight of a:b of from 1:1 to 9:1, as said foam-inhibiting substance.

4. The process of claim 3 wherein n is an integer of from 8 to 10.

5. The process of claim 3 wherein n is 9 and $R^2$ is n-butyl.

6. The process of claim 3 wherein said mixture is present in a foam-inhibiting amount of from 10 to 2500 ppm.

7. The process of claim 6 wherein said foam-inhibiting amount is from 50 to 500 ppm.

8. A cleaning composition for use in an aqueous system comprising from 0 to 25% of at least one wetting agnet, from 0 to 80% of at least one builder and complexing agent, from 0 to 80% of an alkali metal hydroxide, and from 1% to 30% of at least one foam-inhibiting ccmposition for use in an aqueous solution consisting essentially of (a) an alkyl polyethylene glycol alkyl ether having the formula $$R^1-O-(CH_2CH_2O)_n-R^2$$

wherein $R^1$ is a member having from 12 to 18 carbon atoms selected from the group consisting of alkyl and alkenyl, $R^2$ is an alkyl having from 4 to 8 carbon atoms and n is an integer of from 7 to 12 and (b) a polyglycerol polyethylene glycol alkyl ether of 1 part by weight of polyglycerol having a hydroxyl number in the range of from 900 to 1200 adducted with from 4 to 20 parts by weight of ethylene oxide and etherified at the free hydroxyl group with alkyls having from 4 to 8 carbon atoms, in a ratio of weight of a:b of from 1:1 to 9:1, as said foam-inhibiting substance.

9. A cleaning composition for use in an aqueous system comprising from 0 to 25% of at least one wetting agent, from 0 to 80% of at least one builder and complexing agent, from 0 to 80% of an alkali metal hydroxide, and from 1% to 30% of at least one foam-inhibiting composition for use in an aqueous solution consisting essentially of a) an alkyl polyethylene glycol alkyl ether having the formula $$R^1-O-(CH_2CH_2O)_n-R^2$$

wherein $R^1$ is a member having from 8 to 18 carbon atoms selected from the group consisting of alkyl and alkenyl, $R^2$ is an alkyl having from 4 to 8 carbon atoms and n is an integer of from 7 to 12, and b) a polyglycerol polyethylene glycol alkyl ether of 1 part by weight of polyglycerol having a hydroxy number in the range of from 900 to 1200 adducted with from 4 to 20 parts by weight of ethylene oxide and etherified at the free hydroxyl groups with alkyls having from 4 to 8 carbon atoms, in a ratio by weight of a:b of from 1:1 to 9:1, where the total amount of ingredients is 100%.

* * * * *